(12) United States Patent
Tan et al.

(10) Patent No.: US 7,423,677 B2
(45) Date of Patent: Sep. 9, 2008

(54) COLOR FILTER METHOD AND APPARATUS

(75) Inventors: Boon Keat Tan, Penang (MY); Chin Hin Oon, Penang (MY)

(73) Assignee: Avago Technologies ECBU IP Pte Ltd, Singapore (SG)

( * ) Notice: Subject to any disclaimer, the term of this patent is extended or adjusted under 35 U.S.C. 154(b) by 715 days.

(21) Appl. No.: 10/900,759

(22) Filed: Jul. 27, 2004

(65) Prior Publication Data

US 2006/0023093 A1 Feb. 2, 2006

(51) Int. Cl.
*H04N 9/093* (2006.01)

(52) U.S. Cl. .................. 348/277; 348/273; 348/280; 250/226; 356/419

(58) Field of Classification Search .......... 348/234, 348/235, 236, 237, 238, 256, 262–294, E9.001, 348/E9.035; 250/226; 356/416, 419
See application file for complete search history.

(56) References Cited

U.S. PATENT DOCUMENTS

| | | | | | |
|---|---|---|---|---|---|
| 4,282,547 | A | * | 8/1981 | Morishita | 348/276 |
| 5,642,197 | A | * | 6/1997 | Tuhro et al. | 356/418 |
| 5,668,596 | A | * | 9/1997 | Vogel | 348/222.1 |
| 5,734,424 | A | * | 3/1998 | Sasaki | 348/222.1 |
| 6,067,109 | A | * | 5/2000 | Yamana | 348/104 |
| 6,614,471 | B1 | * | 9/2003 | Ott | 348/238 |
| 6,788,338 | B1 | * | 9/2004 | Dinev et al. | 348/222.1 |
| 6,891,568 | B1 | * | 5/2005 | Glenn | 348/262 |
| 7,088,391 | B2 | * | 8/2006 | Glenn et al. | 348/262 |

FOREIGN PATENT DOCUMENTS

WO WO03023340 A1 * 3/2003

* cited by examiner

*Primary Examiner*—Ngoc-Yen T. Vu
*Assistant Examiner*—Cynthia Calderon

(57) ABSTRACT

Method and apparatus for generating an output signal that represents light with a desired color profile. A first sensor is provided to receive light and based thereon to generate a first signal with a first color profile. A color sensor is also provided that receives light and based thereon generates a second signal with a second color profile. A signal generation mechanism that is coupled to the first sensor and the color sensor and receives the first signal with a first color profile, receives the second signal with a second color profile, and performs a predetermined operation on the first signal and the second signal to generate the output signal with the desired color profile.

6 Claims, 6 Drawing Sheets

V_CLEAR — V_CYAN = V_RED
(NO MULTIPLICATION)

V_CLEAR — 1.2 X V_CYAN = V_RED
(WITH MULTIPLICATION)

COLOR FILTER METHOD AND APPARATUS

BACKGROUND OF THE INVENTION

Color filters are made from materials (e.g., dyes) that allow certain wavelengths of light to pass while blocking other wavelengths of light. For example, a red color filter transmits red light, but blocks other wavelengths of light from passing through. Similarly, a green color filter transmits green light, but blocks other wavelengths of light from passing through. Similarly, a blue color filter transmits blue light, but blocks other wavelengths of light from passing through. As can be appreciated, color filters are important components in realizing color sensors.

FIG. 1 illustrates a prior art method for applying a color filter to a sensor chip to manufacture a corresponding color sensor. First, a layer of red color filter material 4 is applied to the microchip 2 through a photolithographic process, for example. The red filter material coats the microchip 2. Next, portions of the red color filter material that are not needed are removed. What remains is a red color filter 6 that is disposed over the portions of the microchip 2 (e.g., over a sensor area). In this example, a red filter material 4 is applied to the microchip 2. To implement a green sensor, a green filter material is applied to a corresponding sensor. Similarly, to implement a blue sensor, a blue filter material is applied to a corresponding sensor. In this manner, red sensor, a green sensor, and a blue sensor can be manufactured.

As can be appreciated, the above process limits the materials that can be used to realize red sensors, a green sensors, and a blue sensors. Another significant disadvantage of this processing technique for realizing color filters is that the transmittance of other undesired wavelengths are not eliminated. For example, some wavelengths in the infra-red region and the ultra-violet region are not blocked and pass through the prior art color filter implementations. FIG. 1 further illustrates an exemplary transmittance versus wavelength plot 8 for the prior art color sensor and an ideal transmittance versus wavelength plot 9. It is noted that the ideal transmittance versus wavelength plot blocks all wavelengths except the desired wavelength (e.g., wavelength corresponding to red, wavelength corresponding to green, or wavelength corresponding to blue). However, the transmittance versus wavelength plot of the prior art color filter indicates a relatively high transmittance at P1 and P2, which is not desirable.

Another problem with color sensors that is not related to color filters is the dependence on operating temperature. The performance of the sensor and in particular the output voltage generated by the sensor depends on the operating temperature of the color sensor. These differences in output voltage are referred to as offset voltages or leakage current. Prior art color filter implementations do not address or mitigate this problem.

Based on the foregoing, there remains a need for a color filter method and apparatus that that overcomes the disadvantages set forth previously.

SUMMARY OF THE INVENTION

According to one embodiment of the present invention, a method and apparatus for generating an output signal that represents light with a desired color profile are described. A first sensor is provided to receive light and based thereon to generate a first signal with a first color profile. A color sensor is also provided that receives light and based thereon generates a second signal with a second color profile. A signal generation mechanism that is coupled to the first sensor and the color sensor and receives the first signal with a first color profile, receives the second signal with a second color profile, and performs a predetermined operation on the first signal and the second signal to generate the output signal with the desired color profile.

BRIEF DESCRIPTION OF THE DRAWINGS

The present invention is illustrated by way of example, and not by way of limitation, in the figures of the accompanying drawings and in which like reference numerals refer to similar elements.

DETAILED DESCRIPTION

A color filter method and apparatus are described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Color Sensor 200

Figure 2:
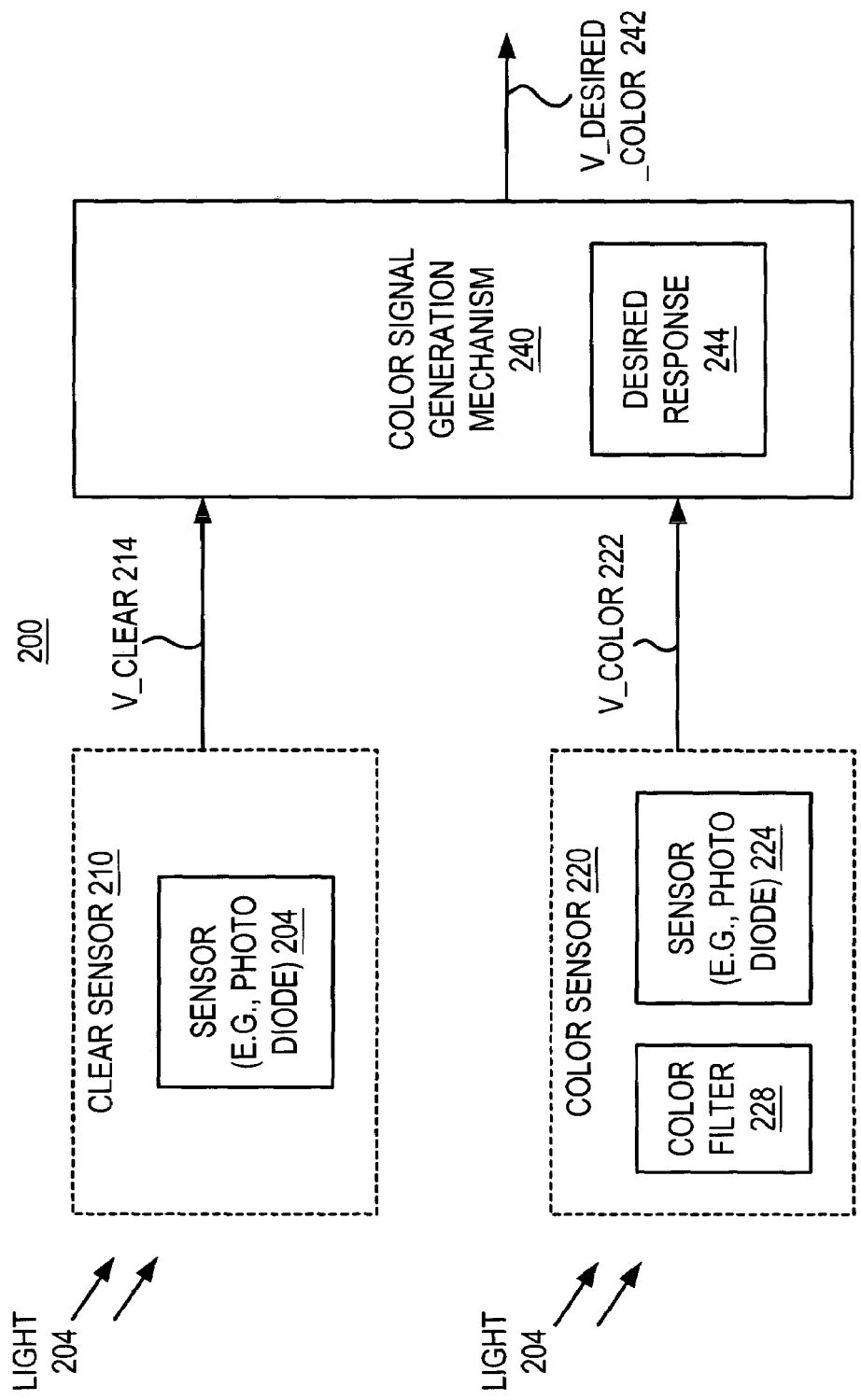
FIG. 2 illustrates a block diagram of a color sensor according to one embodiment of the invention.

FIG. 2 illustrates a block diagram of a color sensor 200 according to one embodiment of the invention. The color sensor 200 includes a clear sensor 210, a color sensor 220, and a desired color signal generation mechanism 240. The clear sensor 210 receives light 204 and based thereon generates an output signal (e.g., V_clear signal) 214 that represents the received light 204. The sensor 210 directly receives light 204 (i.e., there is no color filter preceding the sensor 210). The clear sensor 210 is also referred to herein as a "transparent" sensor 210 or "a sensor without any color filter."

The color sensor 220 receives light 204 and based thereon generates an output signal (e.g., V_color signal) 222 representative of color light (e.g., light corresponding to a limited wavelength range). The color sensor 220 includes a sensor 224 and a color filter 228 to selectively block light of certain wavelengths and to transmit light of a predetermined wavelength.

The desired color signal generation mechanism (DCSGM) 240 is coupled to the clear sensor 210 and the color sensor 220. The desired color signal generation mechanism (DCSGM) 240 receives the V_clear signal 214 and the V_color signal 222. The DCSGM 240 subtracts the V_color signal 222 from V_clear signal 214 to generate a desired color signal (V_desired _color) 242.

Specifically, the following expression is evaluated:

$$V\_desired\_color = V\_clear - V\_color.$$

It is noted that this subtraction operation may be performed with hardware (e.g., hard-wired electronic circuits) or with software. For example, the color filter processing according to the invention may be implemented in hardware, firmware, software, or a combination thereof.

RGB Color Sensor 300

Figure 3:
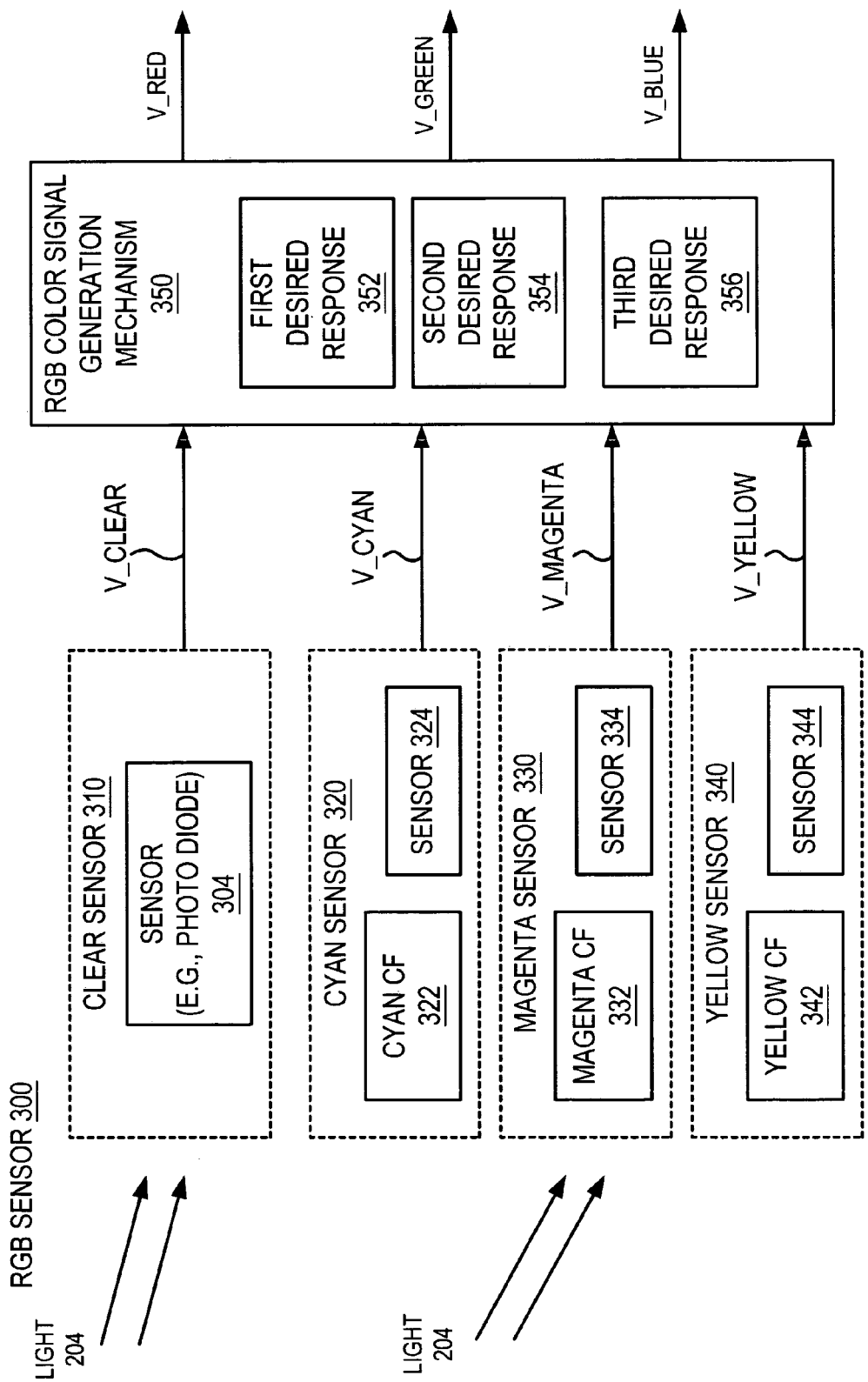
FIG. 3 illustrates a block diagram of a red color sensor, green color sensor, and a blue color sensor according to one embodiment of the invention.

FIG. 3 illustrates a block diagram of a RGB sensor 300 for generating a signal representative of a red color sensor, a signal representative of a green color sensor, and a signal representative of a blue color sensor according to one embodiment of the invention. It is noted that the RGB sensor 300 generates these output signals that represent red, green and blue without the prior art red color filter, green color filter and the blue color filter materials.

The RGB sensor 300 receives light 204 and generates output signals. These output signals can include a first signal representative of a red color sensor (V_red), a second signal representative of a green color sensor (V_green), and a signal representative of a blue color sensor (V_blue). The RGB sensor 300 includes a first sensor 310 (also referred to herein as "clear sensor"), a cyan sensor 320, a magenta sensor 330, and a yellow sensor 340. The cyan sensor 320 includes a cyan color filter 322 and a second sensor 324. The magenta sensor 330 includes a magenta color filter 332 and a third sensor 334. The yellow sensor 340 includes a yellow color filter 342 and a fourth sensor 344.

The RGB sensor 300 also includes a RGB color signal generation mechanism (RGBCSGM) 350 that is coupled to the first sensor 310, the cyan sensor 320, the magenta sensor 330, and the yellow sensor 340. The RGB color signal generation mechanism (RGBCSGM) 350 receives the V_clear signal, the V_cyan signal, the V_magenta signal, and the V_yellow signal and based thereon generates three output signals: a first output signal representative of a red sensor (V_red), a second output signal representative of a green sensor (V_green), and a third output signal representative of a blue sensor (V_blue).

An RGBCSGM 350 includes a first desired response (F_D_R) 352, a second desired response (S_D_R) 354, and a third desired response (T_D_R) 356. In this example, the first desired response 352 is a color profile for red. The second desired response 354 is a color profile for green. The third desired response 356 is a color profile for blue.

BandPass Filter 400

Figure 4:
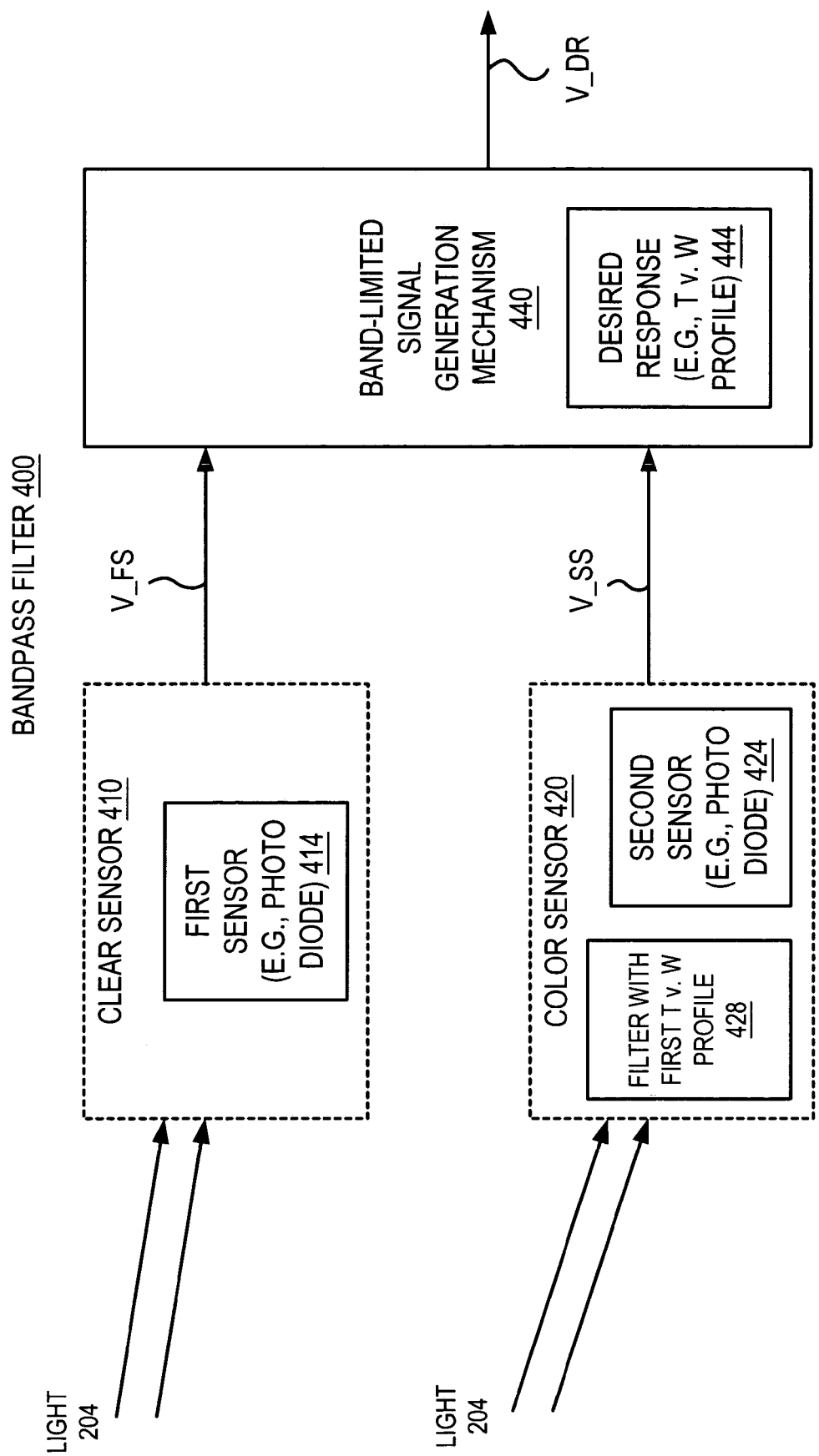
FIG. 4 illustrates a bandpass filter according to one embodiment of the invention.

FIG. 4 illustrates a bandpass filter 400 according to one embodiment of the invention. The first transmittance versus wavelength profile can be, but is not limited to, for example, a profile that passes all wavelengths, all visible wavelengths, or a selected range of wavelengths. The first transmittance versus wavelength profile and second transmittance versus wavelength profile are utilized by the band limited generation mechanism 440 to generate an output signal with a desired transmittance versus wavelength profile (e.g., a bandpass filter—a filter that passes a band or range of wavelengths). The second transmittance versus wavelength profile is selected so that when the second transmittance versus wavelength profile is adjusted (e.g., multiplied) and subtracted from the first transmittance versus wavelength profile, the desired transmittance versus wavelength profile is realized.

It is noted that teachings of the invention can be utilized to generate other desired transmittance versus wavelength profile, such as a notch filter profile. For example, the transmittance versus wavelength profile of a bandpass filter can be added to the transmittance versus wavelength profile of a transparent filter to realize a notch filter profile.

Band Pass Filter 500 with Multiplier

Figure 5:
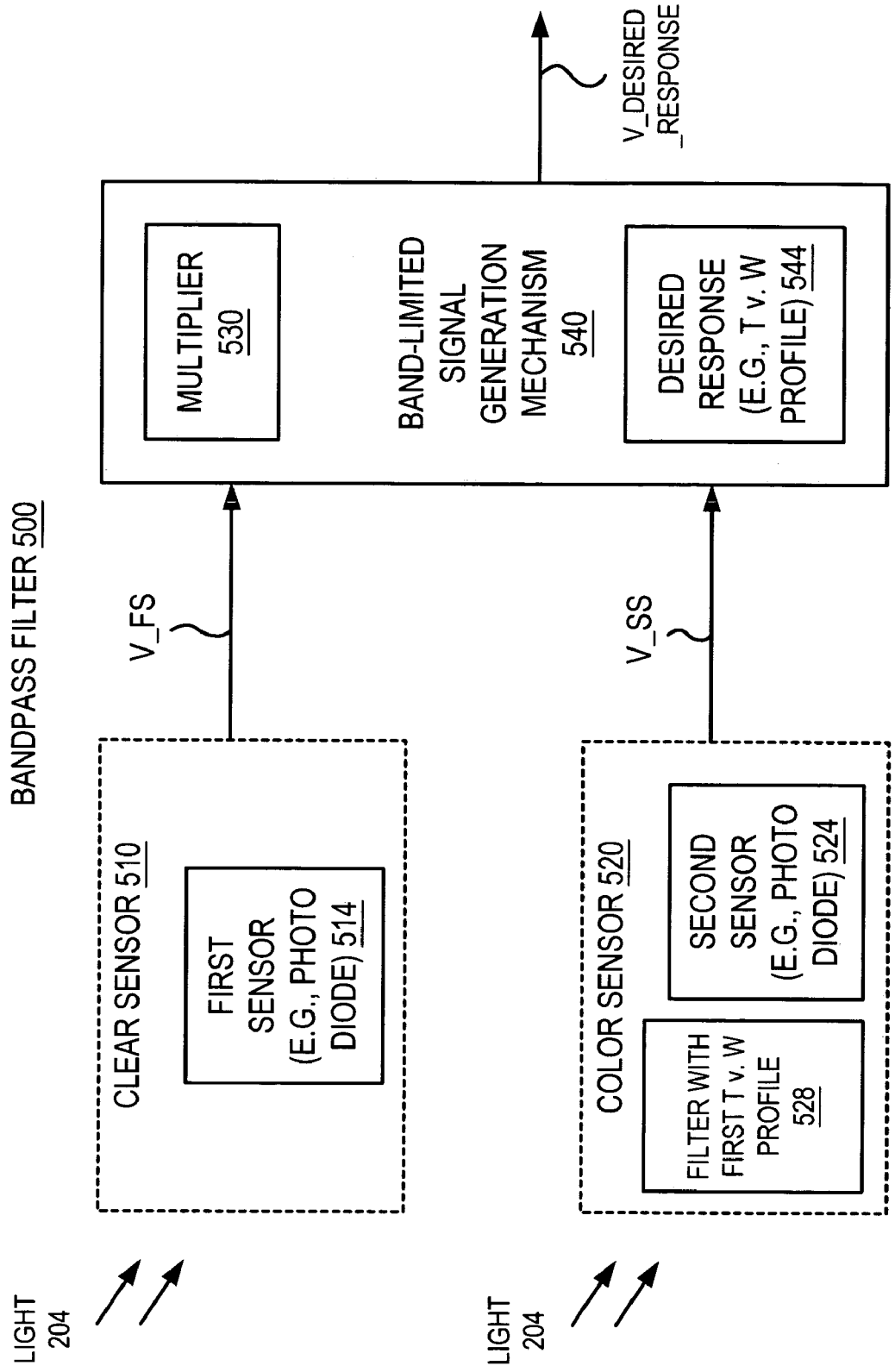
FIG. 5 illustrates a bandpass filter with a multiplier according to another embodiment of the invention.

FIG. 5 illustrates a band pass filter 500 with a multiplier 530 according to another embodiment of the invention. The functional blocks (e.g., 510, 514, 520, 524, 528, 540 and 544) are similar in construction and operation to corresponding the functional blocks (e.g., 410, 414, 420, 424, 428, 440 and 444) illustrated in and described with reference to FIG. 4. Consequently, the description is not repeated herein. However, in this embodiment, band pass filter 500 includes a multiplier to reduce the transmittance of undesired wavelengths as described in FIG. 8.

Transmittance Versus Wavelength Plots

Figure 7:
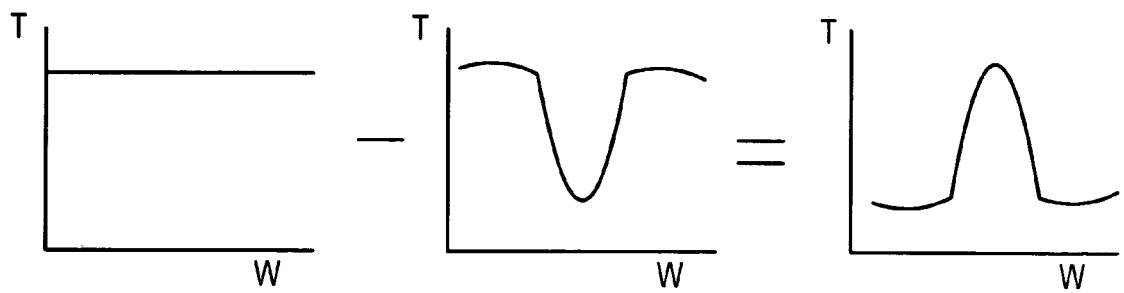
FIG. 7 is a transmittance versus wavelength plot of the color sensor according to one embodiment of the invention.

FIG. 7 is a transmittance versus wavelength plot of the color sensor according to one embodiment of the invention.

The output signal representing the red sensor can be represented by the following expressions:

$$V\_red = V\_clear - (V\_cyan).$$

Figure 1:
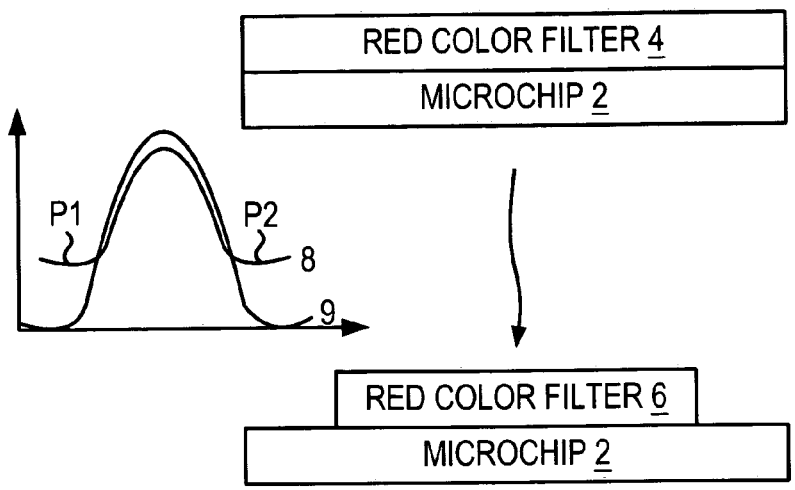
FIG. 1 illustrates a prior art method for applying a color filter to a sensor chip to manufacture a corresponding color sensor.
Figure 8:
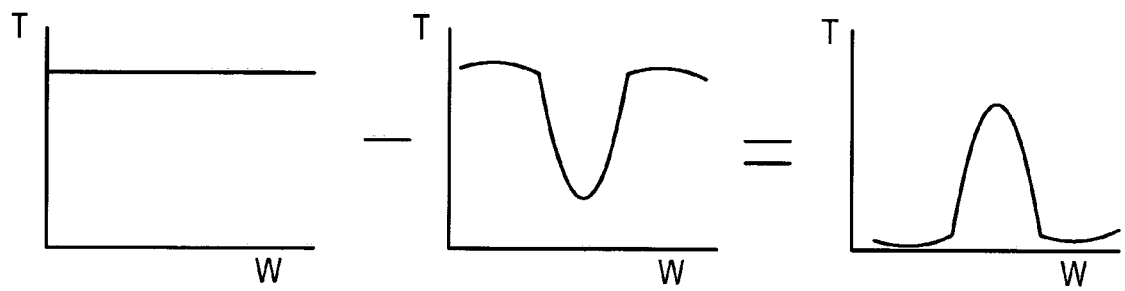
FIG. 8 is a transmittance versus wavelength plot of the color sensor according to another embodiment of the invention with a multiplier.

FIG. 8 is a transmittance versus wavelength plot of the color sensor according to another embodiment of the invention with a multiplier. It is noted that the color profile of the color sensor according to the invention is closer to the ideal profile shown in FIG. 1. Since the cyan transmittance profile is relatively flat in both regions R1 and R2, when the cyan transmittance profile is adjusted (e.g., multiplied by a multiplication factor (MF)), the resulting transmittance profile of the "red" color sensor almost completely blocks all undesired wavelengths (i.e., passing or transmitting only the red wavelength).

The output signal representing the red sensor can be represented by the following expressions:

$$V\_red = V\_clear - MF(V\_cyan), \text{ where MF is the multiplication factor.}$$

An exemplary value for the MF is 1.2. It is noted that other values of MF may be selected to meet or suit the specific requirements of a particular application.

It is noted that the multiplication is performed electronically. For example, in another embodiment, the voltage from transparent sensor is multiplied instead of the voltage from the color sensor to achieve the cancellation. Specifically, one can either a) multiply the transparent voltage by a predetermined factor (e.g., 0.8) before subtracting or b) multiply the voltage from the color sensor by a predetermined factor (e.g., 1.25) before subtraction.

The color filter method and apparatus according to the invention does not require red, green and blue filter material, thereby avoiding the problems associated with manufacturing prior art color filters. Moreover, since the color filter method and apparatus according to the invention employs two sensors to realize a desired color profile, the offset voltages caused by the temperature dependence of the sensors devices are canceled.

Processing

Figure 6:
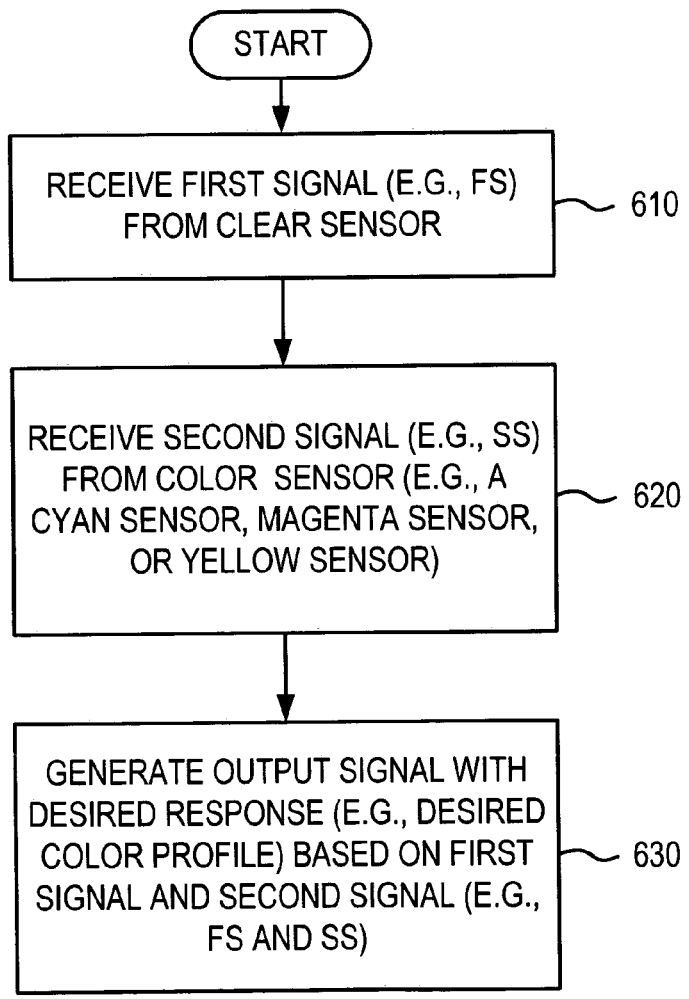
FIG. 6 is a flow chart illustrating the processing steps performed by the color sensor according to one embodiment of the invention.

FIG. 6 is a flow chart illustrating the processing steps performed by the color sensor according to one embodiment of the invention. In step 610, a first signal (FS) is received from a clear or transparent sensor (e.g., a sensor without any color filter that receives whit light), for example. In step 620, a second signal (SS) is received from a color sensor (e.g., a cyan sensor, a magenta sensor, or a yellow sensor), for example.

In step 630, a predetermined operation is performed on the first signal and the second signal to generate an output signal with a desired color profile. The predetermined operation can be, by way of example and not limitation, a mathematical operation (e.g., an addition operation, subtraction operation, multiplication operation, or division operation). For example, in one embodiment, the second signal (SS) is subtracted from the first signal (FS). The resulting difference is a signal with a desired color response (e.g., a red color profile, a green color profile, or a blue color profile). It is noted that the first signal, second signal, or both can be adjusted before the predetermined operation is performed. For example, the first signal can be multiplied by a first predetermined factor, the second signal can be multiplied by a second predetermined factor, or both, prior to performing the predetermined operation on the first signal and the second signal.

The color sensors and filters according to the invention can be implemented in a wide number of different applications for detecting color. This wide range of applications can include, for example, applications for controlling interior lighting and backlighting (e.g., liquid crystal display (LCD) back light), chemical analysis, color control of cosmetics and textiles, and in office automation for controlling the color output of printers and color calibration of image scanners.

Moreover, the color sensors and filters according to the invention can be used in imaging applications (e.g., ink detection), in medical/life science applications (e.g., a blood test), in camera applications (e.g., for camera calibration), and in backlight applications (e.g., a backlight control system). For example, the color sensors and filters according to the invention can be implemented in a cellular telephone, a digital capture device (e.g., a digital camera), a portable computer, a personal digital assistant, a computer monitor, and television.

The color sensors and filters according to the invention can be utilized in applications that include, but are not limited to, color detection applications, color measurement applications, and color control applications. Color detection applications identify the presence or absence of a specific color. Color measurement: applications identify a color based on its red, green and blue components. Color control applications use the color sensor as part of a closed-loop feedback system to produce and maintain a required color.

In the foregoing specification, the invention has been described with reference to specific embodiments thereof. It will, however, be evident that various modifications and changes may be made thereto without departing from the broader scope of the invention. The specification and drawings are, accordingly, to be regarded in an illustrative rather than a restrictive sense.

What is claimed is:

1. An apparatus that eliminates red, green, or blue filters for generating signals representing red, green, and blue components of an input light signal, the apparatus comprising:

a first sensor configured to receive the input light signal and generate therefrom a V_clear voltage corresponding to the input light signal;

a cyan color filter configured to receive the input light signal and propagate therethrough, a cyan light component of the input light signal;

a second sensor coupled to the cyan color filter and configured to generate from the cyan light component, a V_cyan voltage corresponding to the cyan light component;

a magenta color filter configured to receive the input light signal and propagate therethrough, a magenta light component of the input light signal;

a third sensor coupled to the magenta color filter and configured to generate from the magenta light component, a V_magenta voltage corresponding to the magenta light component;

a yellow color filter configured to receive the input light signal and propagate therethrough, a yellow light component of the input light signal;

a fourth sensor coupled to the yellow color filter and configured to generate from the yellow light component, a V_yellow voltage corresponding to the yellow light component; and a desired color signal generation mechanism (DCSGM) configured to receive the V_clear, V_cyan, V_magenta, and V_yellow voltages and generate therefrom, a V_red voltage, a V_green voltage, and a V_blue voltage, the generation comprising at least one of a) a first mathematical operation defined by V_red=V_clear−MF1(V_cyan) where MF1 is a first multiplication factor having a value of about 1.2, or b) a second mathematical operation defined by V_red=MF2(V_clear)−V_cyan where MF2 is a second multiplication factor having a value of about 0.8.

2. The apparatus of claim 1, wherein a first offset voltage generated by the first sensor is canceled by a second offset voltage generated by the second sensor.

3. The apparatus of claim 1, wherein a first offset voltage generated by the first sensor is canceled by one of a) a second offset voltage generated by the second sensor, b) a third offset voltage generated by the third sensor, and c) a fourth offset voltage generated by the fourth sensor.

4. The apparatus of claim 1, wherein the DCSGM comprises an electronic circuit configured to carry out a mathematical operation using the V_clear voltage and the individual V_cyan, V_magenta, and V_yellow voltages respectively to generate therefrom, the corresponding V_red, V_green, and V_blue voltages.

5. The apparatus of claim 1, wherein the V_red, V_green, and V_blue voltages generated by the DCSGM represent red, green and blue light colors in which infra-red wavelengths have been eliminated.

6. The apparatus of claim 1, wherein the V_red, V_green, and V_blue voltages generated by the DCSGM represent red, green and blue light colors in which ultra-violet wavelengths have been eliminated.

* * * * *